US009569685B2

(12) United States Patent
Jung et al.

(10) Patent No.: US 9,569,685 B2
(45) Date of Patent: Feb. 14, 2017

(54) IMAGE PROCESSING APPARATUS AND METHOD FOR DETECTING PARTIALLY VISIBLE OBJECT APPROACHING FROM SIDE USING EQUI-HEIGHT PERIPHERAL MOSAICKING IMAGE, AND DRIVING ASSISTANCE SYSTEM EMPLOYING THE SAME

(71) Applicant: Kyungpook National University Industry-Academic Cooperation Foundation, Daegu (KR)

(72) Inventors: Soon Ki Jung, Daegu (KR); Min Woo Park, Gyeongsangnam-do (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 143 days.

(21) Appl. No.: 14/554,627

(22) Filed: Nov. 26, 2014

(65) Prior Publication Data

US 2016/0012303 A1    Jan. 14, 2016

(30) Foreign Application Priority Data

Jul. 10, 2014    (KR) .......................... 10-2014-0086945

(51) Int. Cl.
*G06K 9/46*    (2006.01)
*G06K 9/52*    (2006.01)
(Continued)

(52) U.S. Cl.
CPC ............. *G06K 9/46* (2013.01); *G06K 9/00805* (2013.01); *G06K 9/52* (2013.01); *G06K 9/627* (2013.01);
(Continued)

(58) Field of Classification Search
None
See application file for complete search history.

(56) References Cited

U.S. PATENT DOCUMENTS 8,199,975 B2    6/2012    Pomerleau et al.
2013/0147983 A1*  6/2013    Park .................. G06K 9/00805
                                                348/222.1
(Continued)

FOREIGN PATENT DOCUMENTS

JP    2003281700 A    10/2003
JP      3606223 B2     1/2005
(Continued)

OTHER PUBLICATIONS

Hultqvist et al. "Detecting and positioning overtaking vehicles using 1D optical flow", 2014 IEEE Intelligent Vehicles Symposium (IV), Jun. 8-11, 2014.*
(Continued)

*Primary Examiner* — Yingchun He
(74) *Attorney, Agent, or Firm* — Carter, DeLuca, Farrell & Schmidt, LLP

(57) ABSTRACT

Provided are an image processing apparatus and method, and a driving assistance system employing the same. The image processing apparatus includes a peripheral region extracting unit extracting, from an image, peripheral regions corresponding to a size of a target object determined in advance, a modifying unit modifying the peripheral regions to allow a viewpoint for the peripheral regions to be changed, a mosaicking image creating unit creating a mosaicking image by stitching the modified peripheral regions together, and an object detection unit detecting an object including a part of the target object from the mosaicking image.

24 Claims, 13 Drawing Sheets

(51) Int. Cl.
*G06T 11/60* (2006.01)
*G06T 3/00* (2006.01)
*G06K 9/00* (2006.01)
*G06K 9/62* (2006.01)
*G06T 3/40* (2006.01)

(52) U.S. Cl.
CPC ........... *G06T 3/0093* (2013.01); *G06T 3/4038* (2013.01); *G06T 11/60* (2013.01); *G06K 2009/4666* (2013.01)

(56) References Cited

U.S. PATENT DOCUMENTS

2013/0250114 A1* 9/2013 Lu .................. H04N 5/23238
348/148
2014/0293057 A1* 10/2014 Wierich ................ G02B 5/10
348/148

FOREIGN PATENT DOCUMENTS

| KR | 101115076 A | 3/2012 |
|----|-------------|--------|
| WO | 2012/164804 A1 | 12/2012 |

OTHER PUBLICATIONS

Seeger "Cross-Validation Optimization for Large Scale Structured Classification Kernel Methods", Journal of Machine Learning Research 9, 2008, p. 1147-1179.*

Felzenszwalb et al., "Object Detection with Discriminatively Trained Part Based Models", Pattern Analysis and Machine Intelligence, IEEE Transactions, vol. 32, Issue 9, Sep. 2009, pp. 1627-1645.

* cited by examiner

IMAGE PROCESSING APPARATUS AND METHOD FOR DETECTING PARTIALLY VISIBLE OBJECT APPROACHING FROM SIDE USING EQUI-HEIGHT PERIPHERAL MOSAICKING IMAGE, AND DRIVING ASSISTANCE SYSTEM EMPLOYING THE SAME

CROSS-REFERENCE TO RELATED APPLICATIONS

This U.S. non-provisional patent application claims priority under 35 U.S.C. §119 of Korean Patent Application No. 10-2014-0086945, filed on Jul. 10, 2014, the entire contents of which are hereby incorporated by reference.

BACKGROUND OF THE INVENTION

The present invention disclosed herein relates to an image processing apparatus and method, and a driving assistance system employing the same.

Technologies for detecting an object by processing an image captured by a camera are being used in various fields. As an example, a driving assistance system for recognizing obstacles in periphery of a vehicle at the time of driving the vehicle and providing information thereon to a driver may use object detection technology as a method of recognizing the obstacles.

The driving assistance system requires rapid image processing because it is required to instantly provide information on peripheral obstacles to the driver on the drive.

Typically, an image obtained by capturing periphery of a moving vehicle, for example, the forward view of the moving vehicle is of a predetermined size and has multiple obstacles including vehicles and pedestrians dispersed therein. In this case, a process for processing the image and detecting objects corresponding to the obstacles from the image takes a considerable amount of time.

Furthermore, when objects corresponding to obstacles are detected from a forward view image of the moving vehicle, other vehicles ahead of the moving vehicle may be grasped by detecting rear ends thereof. However, a vehicle abruptly appearing in the forward view image by passing by the moving vehicle or a vehicle of which a part appears in the forward view image is difficult to rapidly detect or is unable to detect.

SUMMARY OF THE INVENTION

The present invention provides an image processing apparatus and method capable of shortening a processing time by reducing the number of function calling for object detection and reducing a calculation amount required for object detection from an image, and a driving assistance system employing the same.

The present invention also provides an image processing apparatus and method capable of accurately and rapidly detecting a vehicle abruptly appearing in the forward view image by passing by a moving vehicle or a vehicle of which only a part appear in the forward view image, and a driving assistance system employing the same.

Embodiments of the present invention provide image processing devices including a peripheral region extracting unit extracting, from an image, peripheral regions corresponding to a size of a target object determined in advance; a modifying unit modifying the peripheral regions to allow a viewpoint for the peripheral regions to be changed, a mosaicking image creating unit creating a mosaicking image by stitching the modified peripheral regions together, and an object detection unit detecting an object including a part of the target object from the mosaicking image.

In some embodiments, the peripheral region extracting unit may include a vanishing point detection unit detecting a vanishing point from the image; a region size calculating unit designating a horizontal line at every preset interval in a vertical direction from the vanishing point on the image and calculating a region height and a region width corresponding to a height and a width of the target object at each of the horizontal lines; and a region cutting unit cutting regions having a height of the region height from each of the horizontal lines and a width of the region width from sides of the image.

In other embodiments, the region cutting unit may cut a left region having a height of the region height from each of the horizontal lines and a width of the region width from the left side of the image, and cuts a right region having a height of the region height from each of the horizontal lines and a width of the region width from the right side of the image.

In still other embodiments, the peripheral region extracting unit may further include an bird's eye view image converting unit converting the image into an bird's eye view image, and the peripheral size calculating unit designating an bird's eye view horizontal line at every preset interval and designate the horizontal lines on the image by converting coordinates of the bird's eye view horizontal lines on the bird's eye view image into coordinates on the image.

In even other embodiments, the region height and the region width may be proportional to a distance between a corresponding horizontal line and the vanishing point.

In yet other embodiments, the modifying unit may warp the peripheral regions to allow the viewpoint to face a direction perpendicular to a central axis of a lens capturing the image.

In further embodiments, the mosaicking image creating unit may create the mosaicking image by adjusting heights of the modified peripheral regions equally and stitching the height-adjusted peripheral regions together in a horizontal direction.

In still further embodiments, the object detecting unit may detect the object in the horizontal direction with respect to the mosaicking image.

In even further embodiments, the target object may be a vehicle and the object includes a wheel of the vehicle.

In yet further embodiments, the object detection unit may detect a part of the vehicle including the wheel from the mosaicking image by means of a machine learning algorithm by using the vehicle's wheel as feature points.

In much further embodiments, the image processing device may further include a coordinate converting unit converting a coordinate of the detected object on the mosaicking image into a coordinate of the image.

In still much further embodiments, the image processing device may further include an image calibrating unit calibrating at least one of lens distortion and skew for the image, before extracting the peripheral regions.

In other embodiments of the present invention, image processing methods include: extracting, from an image, peripheral regions corresponding to a size of a target object determined in advance; modifying the peripheral regions to allow a viewpoint of the peripheral regions to be changed; stitching the modified peripheral regions together and creating a mosaicking image; and detecting an object including a part of the target object from the mosaicking image.

In some embodiments, the extracting of the peripheral regions may include detecting a vanishing point from the image; designating a horizontal line at every preset interval in a vertical direction from the vanishing point on the image; calculating a region height and a region width corresponding to a height and a width of the target object at each of the horizontal lines; and cutting regions having a height of the region height from each of the horizontal lines and a width having the region width from sides of the image.

In other embodiments, the cutting of the regions may include cutting a left region having a height of the region height from each of the horizontal lines and a width of the region width from the left side of the image; and cutting a right region having a height of the region height from each of the horizontal lines and a width of the region width from the right side of the image.

In still other embodiments, the designating of the horizontal line may include converting the image into an bird's eye view image; designating an bird's eye view horizontal line at every present interval on the bird's eye view image; and converting coordinates of the bird's eye view horizontal lines on the bird's eye view image into coordinates on the image.

In even other embodiments, the region height and the region width may be proportional to a distance between a corresponding horizontal line and the vanishing point.

In yet other embodiments, the modifying of the peripheral regions may include warping the peripheral regions to allow the viewpoint to face a direction perpendicular to a central axis of a lens capturing the image.

In further embodiments, the creating of the mosaicking image may include adjusting heights of the modified peripheral regions equally; and stitching the height-adjusted peripheral regions together in a horizontal direction.

In still further embodiments, the detecting of the object may include detecting the object in the horizontal direction with respect to the mosaicking image.

In even further embodiments, the target object may be a vehicle and the object comprises a wheel of the vehicle.

In yet further embodiments, the detecting of the object may include detecting a part of the vehicle including the wheel from the mosaicking image by means of a machine learning algorithm by using the vehicle's wheel as feature points.

In much further embodiments, the image processing method may further include converting a coordinate of the detected object on the mosaicking image into a coordinate of the image, after the detecting of the object.

In still much further embodiments, the image processing method may further include calibrating at least one of lens distortion and skew for the image, before the extracting of the peripheral regions.

In still other embodiments of the present invention, driving assistance systems including: a camera capturing periphery of a vehicle; an image processing device processing an image captured by the camera and detecting an object in the periphery of the vehicle; and an output unit outputting information on the detected object, wherein the image processing device comprises a peripheral region extracting unit extracting, from the image, peripheral regions corresponding to a size of a target object determined in advance; a modifying unit modifying the peripheral regions to allow a viewpoint for the peripheral regions to be changed; a mosaicking image creating unit creating a mosaicking image by stitching the modified peripheral regions together; and an object detection unit detecting the object including a part of the target object from the mosaicking image.

In even other embodiments, the camera may capture a forward view of the vehicle, and the target object is another vehicle passing by a side of the vehicle.

In yet other embodiments, the image processing device may further include a coordinate converting unit converting a coordinate of the detected object on the mosaicking image into a coordinate on the image.

In further embodiments, the image processing device may further include an image calibrating unit calibrating at least one of lens distortion and skew for the image before extracting the peripheral regions from the image.

In still further embodiments of the present invention, the image processing method is implemented with a computer-executable program recorded on a computer readable storage medium.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
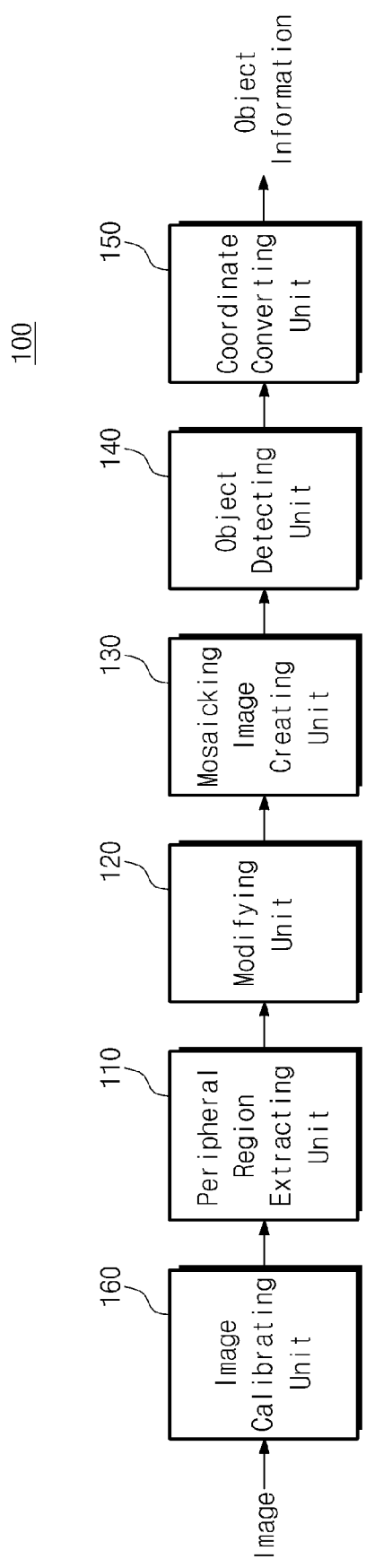
FIG. 1 is an exemplary block diagram of an image processing apparatus according to an embodiment of the present invention.

Advantages and features of the present invention, and methods for achieving the same will be cleared with reference to exemplary embodiments described later in detail together with the accompanying drawings. However, the present invention is not limited to the following exemplary embodiments, but realized in various forms. In other words, the present exemplary embodiments are provided just to complete disclosure the present invention and make a person having an ordinary skill in the art understand the scope of the invention. The present invention should be defined by only the scope of the accompanying claims.

Unless otherwise defined, all terms including technical and scientific terms used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terms and words used in the following description and claims are to describe embodiments but are not limited the inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Also, the terms, such as 'unit', 'block', 'module', or the like, used herein may mean a unit that processes at least one function or operation. For example, they may mean a software element or a hardware element such as a field programmable gate array (FPGA) or an application specific integrated circuit (ASIC). However, it does not mean that 'unit', 'block', 'module', or the like is limited to the software or the hardware. The 'unit', 'block', 'module', or the like may be configured to be in an addressable storage medium or to implement one or more processors.

Accordingly, as an example, the 'unit', 'block', 'module', or the like includes elements such as software, object-oriented software, classes, and tasks processes, functions, attributes, procedures, subroutines, program code segments, drivers, firmware, micro codes, circuits, data, database, data structures, tables, arrays, and variables. Functions provided in the elements, 'units', 'blocks', or 'modules' may be combined with the smaller number of elements, 'units', 'blocks', or 'modules', or separated into additional elements, units', 'blocks', or 'modules'.

Hereinafter, it will be described about an exemplary embodiment of the present invention in conjunction with the accompanying drawings.

FIG. 1 is an exemplary block diagram of an image processing device 100 according to an embodiment of the present invention.

As illustrated in FIG. 1, the image processing apparatus 100 may include a peripheral region extracting unit 110, a modifying unit 120, a mosaicking image creating unit 130, and an object detecting unit 140.

The peripheral region extracting unit 110 may extract peripheral regions corresponding to a size of a target object determined in advance from an image. The modifying unit 120 may modify the peripheral regions to allow a view point for the peripheral regions to be changed. The mosaicking image creating unit 130 may create a mosaicking image by stitching the modified peripheral regions together. The object detecting unit 140 may detect an object including a part of the target object from the mosaicking image.

The image processing apparatus 100 is an apparatus for receiving an image, processing the image, and detecting an object included in the image, and may include a processor such as a GPU, or a CPU. The processor may call and execute an image processing program stored in a storage device, and obtain information on the object included in the image.

Figure 2:
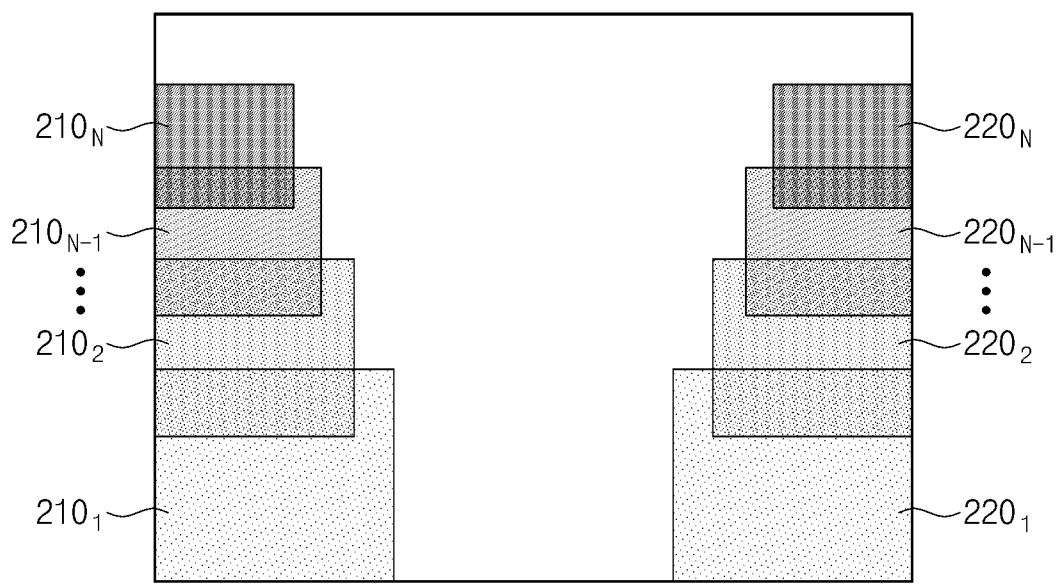
FIG. 2 is an exemplary view for explaining peripheral regions extracted from an image according to an embodiment of the present invention.

FIG. 2 is an exemplary view for explaining peripheral regions $210_1$ to $210_N$ and $220_1$ to $220_N$ extracted from an image 20 according to an embodiment of the present invention.

As illustrated in FIG. 2, the peripheral region extraction unit 110 may extract, from the image 20, the peripheral regions $210_1$ to $210_N$, and $220_1$ to $220_N$ corresponding to a size of the target object.

According to an embodiment of the present invention, the peripheral regions $210_1$ to $210_N$, and $220_1$ to $220_N$ are, as regions positioned on peripherals of the image 20, positioned at left and right sides of the image 20 as illustrated in FIG. 2. According to an embodiment, when the peripheral regions $210_1$ to $210_N$, and $220_1$ to $220_N$ are positioned on the peripherals of the image 20, the positions thereof are not limited to the left and right side of the image 20 and may be at least one selected from the left side, the right side, the upper side, and the lower side.

The peripheral regions $210_1$ to $210_N$, and $220_1$ to $220_N$ may correspond to the size of the target object desired to detect through image processing. The sizes of the peripheral regions $210_1$ to $210_N$, and $220_1$ to $220_N$ extracted from the image 20 may be determined in advance and set in the image processing device 100.

According to an embodiment of the present invention, the image processing device 100 may be used in a driving assistance system that recognizes various obstacles positioned in periphery of the moving vehicle and provides information on the recognized obstacles to the driver. In this case, the target object desired to detect through the image processing may be a vehicle.

In detail, the image processing device 100 according to an embodiment of the present invention detects a vehicle from an image obtained by capturing the forward view of the moving vehicle, and may detect, as the target object, a vehicle that abruptly appears in the image by passing by a side of the moving vehicle or of which a part, not the entirety, appears in the image.

In this case, since the target object is the vehicle of which only a part appears in the forward view image while passing by the side of the moving vehicle, the peripheral regions $210_1$ to $210_N$, and $220_1$ to $220_N$ extracted by the peripheral region extracting unit 110 may be positioned at peripherals, namely, at the left and right sides of the image 20.

According to an embodiment of the present invention, the peripheral region extracting unit 110 may include a vanishing point detecting unit, a region size calculating unit, and a region cutting unit.

The vanishing point detecting unit may detect a vanishing point from the image 20. The region size calculating unit may designate a horizontal line at every preset interval in a vertical direction from the vanishing point on the image 20, and calculate a region height and a region width corresponding to the height and width of the target object at each horizontal line. The region cutting unit may cut out a region having a height of the region height from each of the horizontal lines and a width of the region width from the sides of the image.

Figure 3:
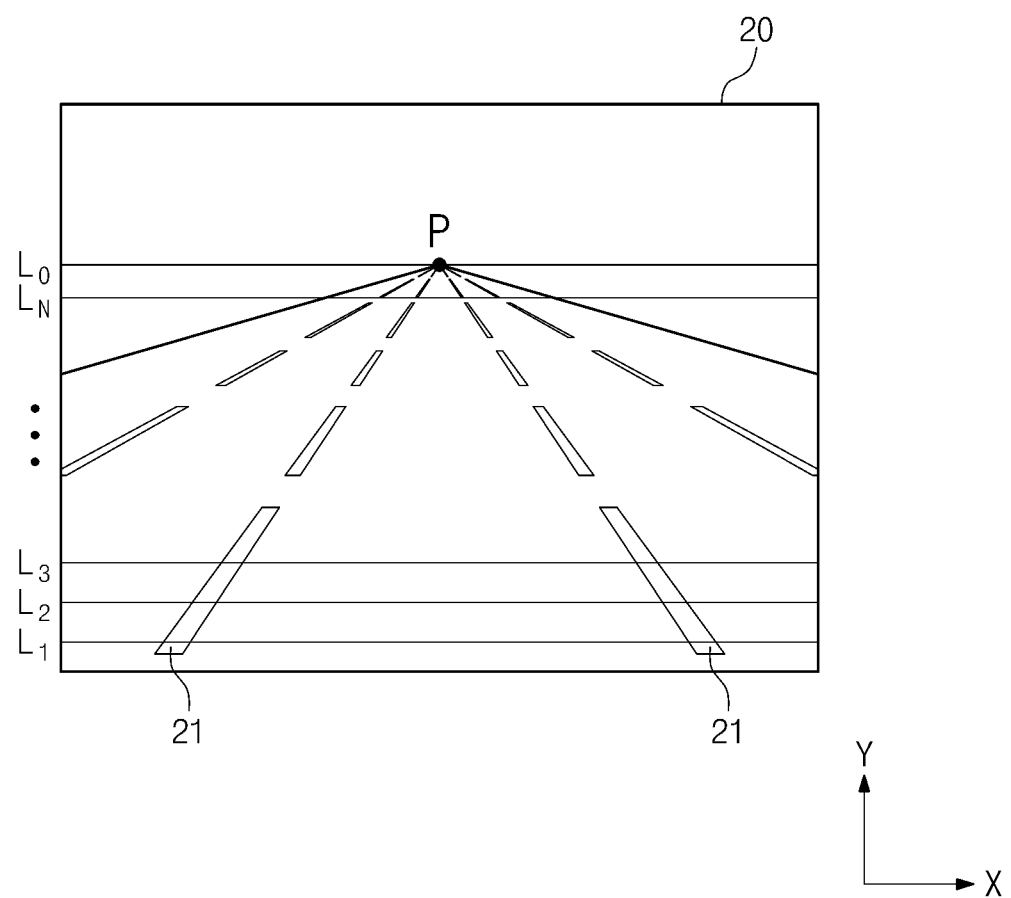
FIG. 3 is an exemplary view for explaining a process of designating horizontal lines on the image according to an embodiment of the present invention.

FIG. 3 is an exemplary view for explaining a process of designating horizontal lines on the image according to an embodiment of the present invention.

Firstly, in order to extract the peripheral regions $210_1$ to $210_N$, and $220_1$ to $220_N$ corresponding to the size of the target object from the image 20, the vanishing point extracting unit may detect a vanishing point P of the image 20.

According to an embodiment, the vanishing point detecting unit may detect the vanishing point P by using lines included in the image 20.

The image 20 illustrated in FIG. 3 is an image obtained by capturing the forward view of the moving vehicle, and may include multiple lines including lanes 21.

The vanishing point detecting unit may detect only lines corresponding to the lanes 21 among the multiple lines and, on the basis of them, the vanishing point P of the image 20 may be detected.

Furthermore, a horizontal line $L_0$ passing through the vanishing point on the image 20 may be considered as the horizon.

Then, the region size calculating unit may designate respective horizontal lines $L_1$ to $L_N$ at every preset interval in a vertical direction (namely, a direction parallel to y-axis in FIG. 3) from the vanishing point P on the image 20.

Since the horizontal lines $L_1$ to $L_N$ are points where objects desired to detect are expected to be positioned, when a vehicle positioned on a road in FIG. 3 is desired to detect, the region size calculating unit may designate respective horizontal lines $L_1$ to $L_N$ at every preset interval only below the horizon $L_0$.

According to an embodiment, the respective horizontal lines $L_1$ to $L_N$ may be designated at every equal interval on the image 20, but are not limited hereto and may be designated in an ununiform interval.

The closer the object is to the horizon $L_0$, the smaller the size of the object on the image 20 is. When an object corresponding to a vehicle is desired to detect from the image 20, it may be fine to more precisely detect an obstacle close to the moving vehicle than an obstacle far away from the moving vehicle.

In this case, the horizontal lines $L_1$ to $L_N$ may be designated in a ununiform interval according to a distance from the bottom end of the image 20, which corresponds to a capturing point of a camera, or the horizon $L_0$. For example, the closer the horizontal lines $L_1$ to $L_N$ are to the lower end of the image 20, the narrower the interval between the horizontal lines $L_1$ to $L_N$ is, and, the closer the horizontal lines $L_1$ to $L_N$ are to the horizon $L_0$, the wider the interval between the horizontal lines $L_1$ to $L_N$ is.

In order to designate the horizontal lines $L_1$ to $L_N$ on the image 20, the region size calculating unit may use an bird's eye view image of the image 20.

According to the embodiment, the peripheral region extracting unit 110 may further include an bird's eye view image converting unit converting the image 20 into the bird's eye view image.

In addition, the region size calculating unit may designate the horizontal lines $L_1$ to $L_N$ on the image 20 by designating an bird's eye view horizontal line at every preset interval on the bird's eye view and converting coordinates of the bird's eye view horizontal lines on the bird's eye view image into coordinates on the image 20.

Figure 4:
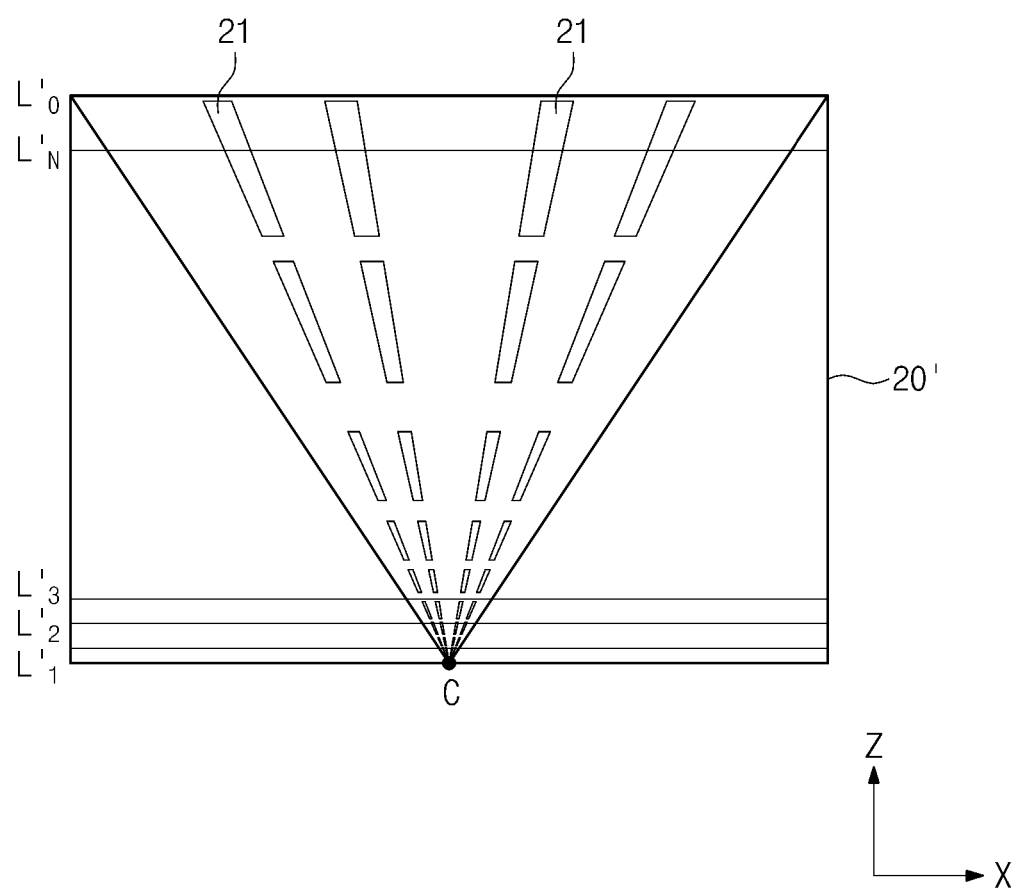
FIG. 4 is an exemplary view for explaining a process of designating horizontal lines on the image by using an bird's eye view image according to another embodiment of the present invention.

FIG. 4 is an exemplary view for explaining a process of designating horizontal lines on the image 20 by using the bird's eye view image 20' according to another embodiment of the present invention.

As illustrated in FIG. 4, the bird's eye view image converting unit may convert the image 20 in which the horizontal lines $L_1$ to $L_N$ are desired to designate into the bird's eye view image 20'.

The image 20 corresponding to an original image represents an image in which an object is projected onto a coordinate plane configured with x- and y-axes, while the bird's eye view image 20' represents an image in which the object is projected onto a coordinate plane configured with x- and z-axes. Here, the x-axis is a coordinate axis parallel to the ground and corresponding to a radial direction of a lens, the y-axis is a coordinate axis perpendicular to the ground in a vertical direction, and the z-axis is a coordinate axis parallel to the ground and the central axis of the lens.

Furthermore, as illustrated in FIG. 4, the region size calculating unit may designate respective bird's eye view horizontal lines $L_1'$ to $L_N'$ at every preset interval on the bird's eye view image 20'.

According to an embodiment, the respective bird's eye view horizontal lines $L_1'$ to $L_N'$ may be designated at every equal interval on the bird's eye view image 20', but are not limited hereto and an interval thereof may be ununiformly set.

For example, as illustrated in FIG. 4, the bird's eye view horizontal lines $L_1'$ to $L_N'$ may be designated so that the interval thereof gets wider from C, which is a capturing point by the camera, towards $L_0'$ corresponding to the horizon.

As a result, image processing efficiency can be improved by detecting an object close to the camera more precisely than an object far away from the camera.

Then, the region size calculating unit may designate the horizontal lines $L_1$ to $L_N$ on the image 20 by converting coordinates on the bird's eye view image 20' for the bird's eye view horizontal lines $L_1'$ to $L_N'$ into coordinated on the image 20, which is the original image.

In addition, the region size calculating unit may calculate the region height and the region width corresponding to the height and width of the target object desired to detect at each horizontal line.

Figure 5:
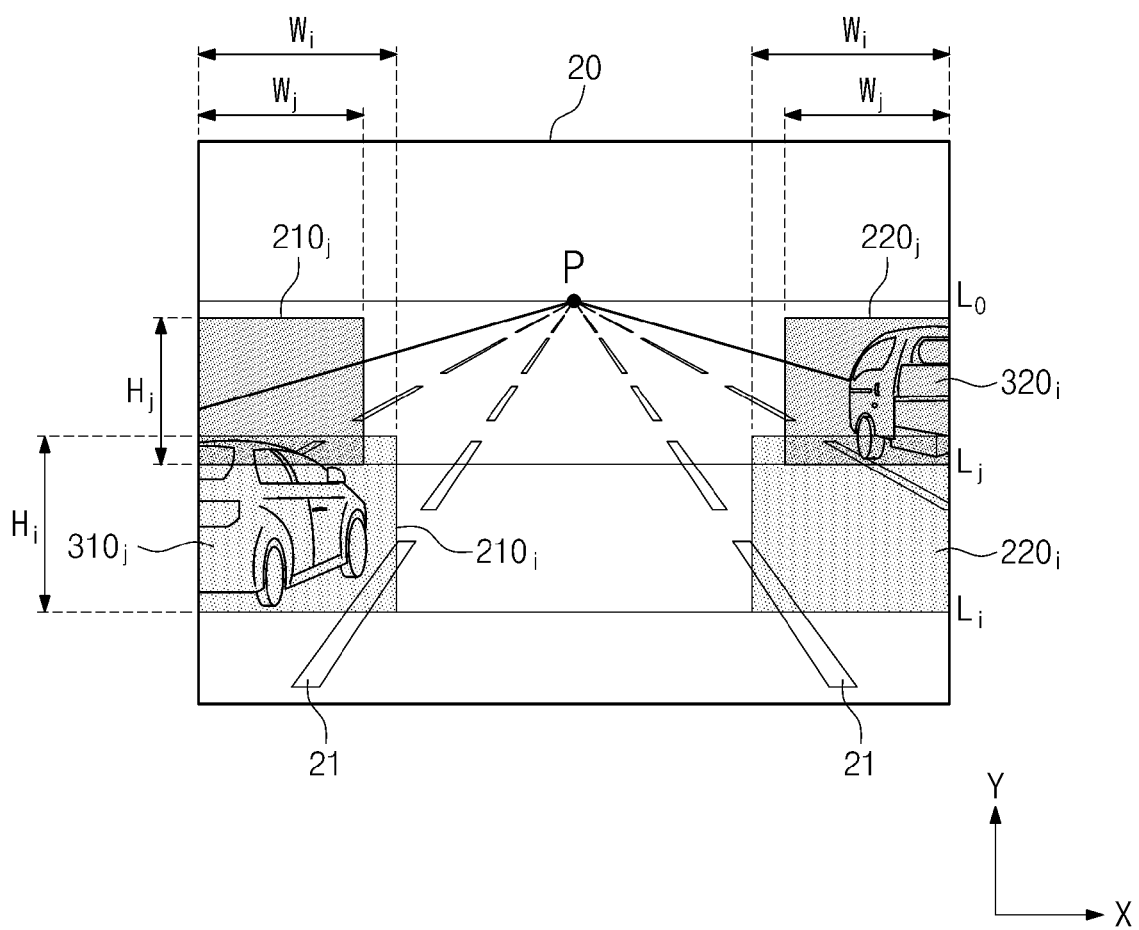
FIG. 5 is an exemplary view for explaining a process of calculating region heights and region widths corresponding to a height and a width of a target object at the horizontal lines according to an embodiment of the present invention.

FIG. 5 is an exemplary view for explaining a process of calculating the region heights $H_i$ and $H_j$ and the region widths $W_i$ and $W_j$ corresponding to the heights and widths of the target objects $310_i$, and $320_j$ according to an embodiment of the present invention The target object desired to detect may be designated with the image processing device 100 according to an application field of the image processing device 100 according to an embodiment of the present invention. For example, as described above, when a driving assistance system is implemented which recognizes a vehicle passing by a side the moving vehicle but allowing only a part thereof to be viewed by using the image processing device 100, and which provides information thereon to the driver, the target object may be the vehicle that passes by the side of the moving vehicle but allows only the part thereof to be viewed.

In such a way, when the vehicle passing by the side of the moving vehicle and allowing the part thereof to be viewed is taken as the target object, the region size calculating unit may calculate a region height corresponding to an actual height of the vehicle on each of the horizontal lines $L_1$ to $L_N$. In addition, the region size calculating unit may calculate the region width corresponding to the actual width of the vehicle from a side of the image 20.

In the image 20 like FIG. 5, even the same sized vehicles may be differed in size of their target objects $310_i$, and $320_j$ in the image 20 according to a distance from the camera. For example, despite of the same sized vehicles, when a vehicle is positioned adjacent to the camera, the object size corresponding thereto becomes large, while when a vehicle is far away from the camera, the object size corresponding thereto becomes small.

According to an embodiment of the present invention, the region heights $H_i$ and $H_j$ corresponding to the height of the target object at each of the horizontal lines $L_1$ to $L_N$ may be calculated to allow the region heights to be proportional to a distance between a corresponding horizontal line and the vanishing point P.

For example, referring to FIG. 5, between the horizontal lines $L_i$ and $L_j$ designated on the image 20, the region height $H_i$ for $L_i$, which is farther away from the vanishing point P, may be greater than that $H_j$ for $L_j$, which is closer to the vanishing point P.

This calculation of the region heights $H_i$, and $H_j$ may be performed by capturing an image of an object corresponding to the target object in advance, obtaining the height $R_H$ of the target object and a distance $R_D$ to the bottom end of the target object from the vanishing point P on the image, calculating each region height H for each of the horizontal lines by using the following equation.

$$H = \frac{R_H}{R_D} \times D \tag{1}$$

where D denotes the distance between the corresponding horizontal line and the vanishing point P.

Similarly, for the region width, the region widths $W_i$, and $W_j$ corresponding to the width of the target object at each of the horizontal lines $L_1$ to $L_N$ may be calculated to allow the region widths to be proportional to a distance between a corresponding horizontal line and the vanishing point P.

For example, referring to FIG. 5, between the horizontal lines $L_i$ and $L_j$ designated on the image 20, the region width $W_i$ for $L_i$, which is farther away from the vanishing point P, may be greater than that $W_j$ for $L_j$, which is closer to the vanishing point P.

Such as this calculation of the region widths Wi, and Wj may be performed by capturing an image for an object corresponding to the target object in advance, obtaining the width RW of the target object on the image and a distance RD to the bottom end of the target object from the vanishing point P on the image, and using the following equation. In such a way, each region height H for each of the horizontal lines may be calculated.

$$W = \frac{R_W}{R_D} \times D \tag{2}$$

where D denotes the distance between the corresponding horizontal line and the vanishing point P.

Through the above-described process, the region size calculating unit may calculate the region heights $H_i$ and $H_j$ and the region widths $W_i$ and $W_j$ corresponding to the heights and the widths of the target objects $310i$, and $320j$ at each of the horizontal lines $L_1$ to $L_N$.

Then, the region cutting unit may cut a region having a height of the region height from each of the horizontal lines $L_1$ to $L_N$ and a width of the region width from the side of the image 20.

For example, as illustrated in FIG. 5, since the region height and the region width for the horizontal line $L_i$ are respectively $H_i$ and $W_i$, and the region height and the region width for the horizontal line $L_j$ are respectively $H_j$ and $W_j$, the region cutting unit may cut peripheral regions $210_i$ and $220_i$ having a width of the region width $W_i$ from a side of the image 20 and cut peripheral regions $210_j$ and $220_j$ having a width of the region width $W_j$ from a side of the image 20.

According to an embodiment of the present invention, the region cutting unit may obtain the peripheral regions $210_1$ to $210_N$, and $220_1$ to $220_N$ by cutting regions corresponding to the region height and the region width at left and right sides of the image 20.

In other words, the region cutting unit may cut the left region having a height of the region height from each of the horizontal lines $L_1$ to $L_N$ and a width of the region width from the left side of the image 20, and the right region having a height of the region height from each of the horizontal lines $L_1$ to $L_N$ and a width of the region width from the right side of the image 20.

Then, the modifying unit 120 may modify the peripheral regions to allow a viewpoint for the peripheral regions $210_1$ to $210_N$, and $220_1$ to $220_N$.

According to an embodiment of the present invention, the modifying unit 120 may warp the peripheral regions $210_1$ to $210_N$, and $220_1$ to $220_N$ to allow the viewpoint to face a direction perpendicular to the central axis of a lens capturing the image 20.

Figure 6:
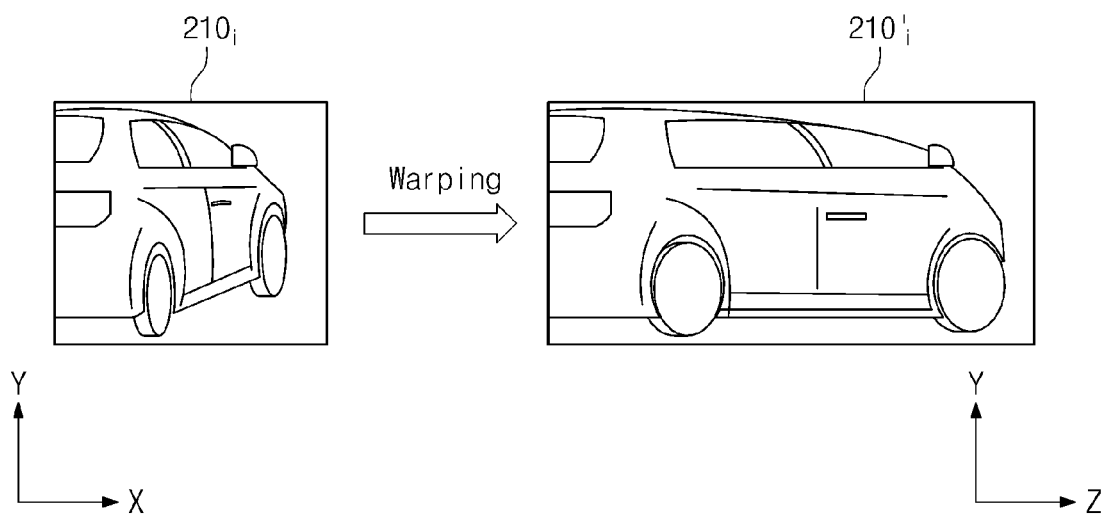
FIGS. 6 and 7 are respective exemplary views for explaining a process of obtaining a warped image by warping left and right peripheral regions according to an embodiment of the present invention.
Figure 7:
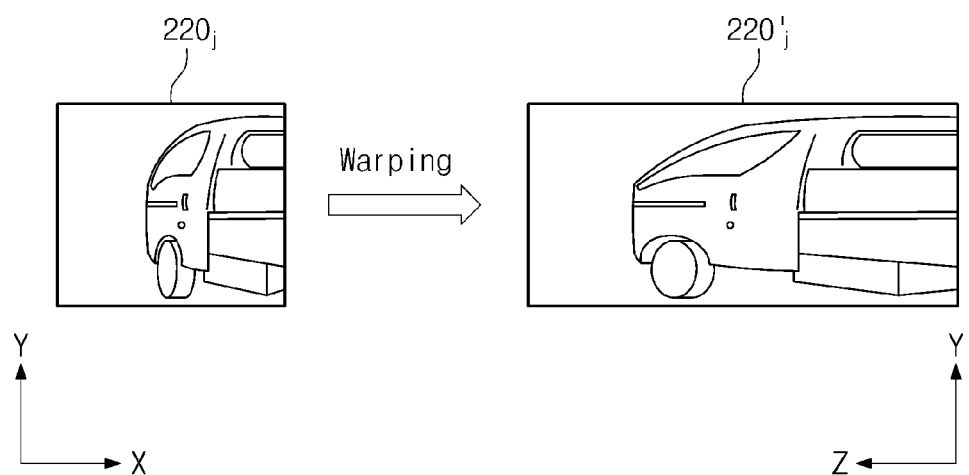

FIGS. 6 and 7 are respective exemplary views for explaining a process of obtaining a warped image by warping left and right peripheral regions according to an embodiment of the present invention.

As illustrated in FIGS. 6 and 7, the modifying unit 120 may change the viewpoint from which the image is to be viewed, namely, a camera position by warping the peripheral regions, for example, the left peripheral region $201_i$ and the right peripheral region $220_j$.

In detail, the image 20 is a forward view image that a forward view of a moving vehicle having a camera mounted thereon is captured. The left peripheral region $210_1$ and the right peripheral region $220_j$ extracted therefrom include respectively vehicles passing by the left and right sides of the moving vehicle, but a viewpoint thereof face a direction parallel to the central axis of the camera lens, namely, the z-axis. Accordingly, a part of rear appearance and side appearance of the vehicle are shown across a small area.

Referring FIGS. 6 and 7, the modifying unit 120 may perform warping for changing the viewpoint to allow the camera to face side surfaces of the vehicle, which are included in the left peripheral region $201_i$ and the right peripheral region $220_j$, while changing a camera position for the left peripheral region $201_i$ and the right peripheral region $220_j$.

As a result, the warped left and right peripheral regions $201_i'$ and $220_j'$ have side appearance of the vehicle across larger areas compared to the left and right peripheral regions $201_i$ and $220_j$ before warping.

Then, the mosaicking image creating unit 130 may create a mosaicking image by stitching the modified peripheral regions together.

The "mosaicking image" used herein means an image in which a plurality of unit images are stitched together in a predetermined direction.

According to an embodiment of the present invention, the mosaicking image creating unit 130 may create a mosaicking image by adjusting heights of the modified peripheral regions to be the same and stitching the height-adjusted peripheral regions together in the horizontal direction.

Figure 8:
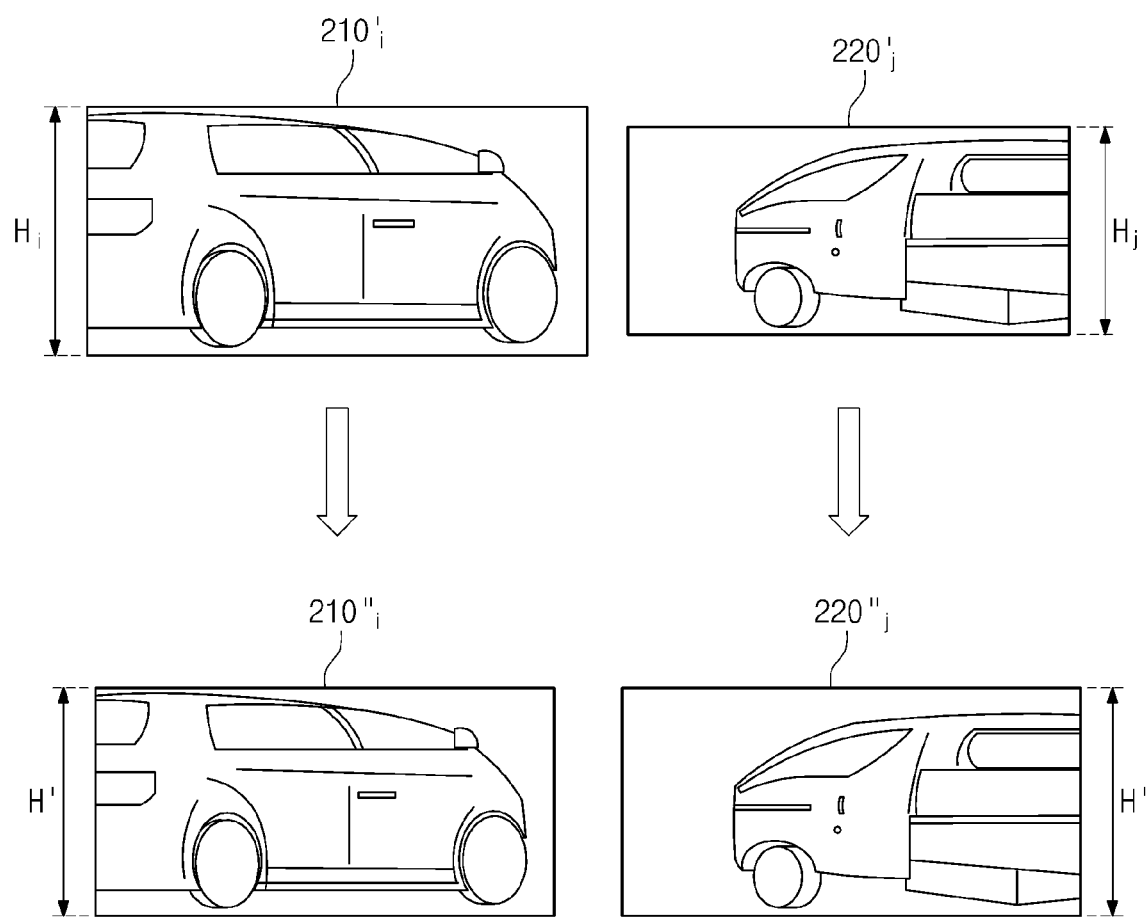
FIG. 8 is an exemplary view for explaining a process of adjusting heights of the warped peripheral regions according to an embodiment of the present invention.

FIG. 8 is an exemplary view for explaining a process of adjusting heights of the warped peripheral regions $210_i'$ and $220_j'$ according to an embodiment of the present invention.

As illustrated in FIG. 8, the mosaicking image creating unit 130 may equally adjust all the heights $H_i$ and $H_j$ of the warped peripheral regions $210_i'$ and $220_j'$ to a height H'. Then, the mosaicking image creating unit 130 may create a mosaicking image by stitching the height-adjusted peripheral regions together in the horizontal direction.

In this case, a left peripheral mosaicking image may be created by connecting the left peripheral regions 2101 to 210N of which heights are adjusted equally in the horizontal direction, and a right image mosaicking image may be created by connecting the right peripheral regions 2201 to 220N of which heights are adjusted equally in the horizontal direction.

Then, the object detection unit 140 may detect an object from the mosaicking image.

Figure 9:
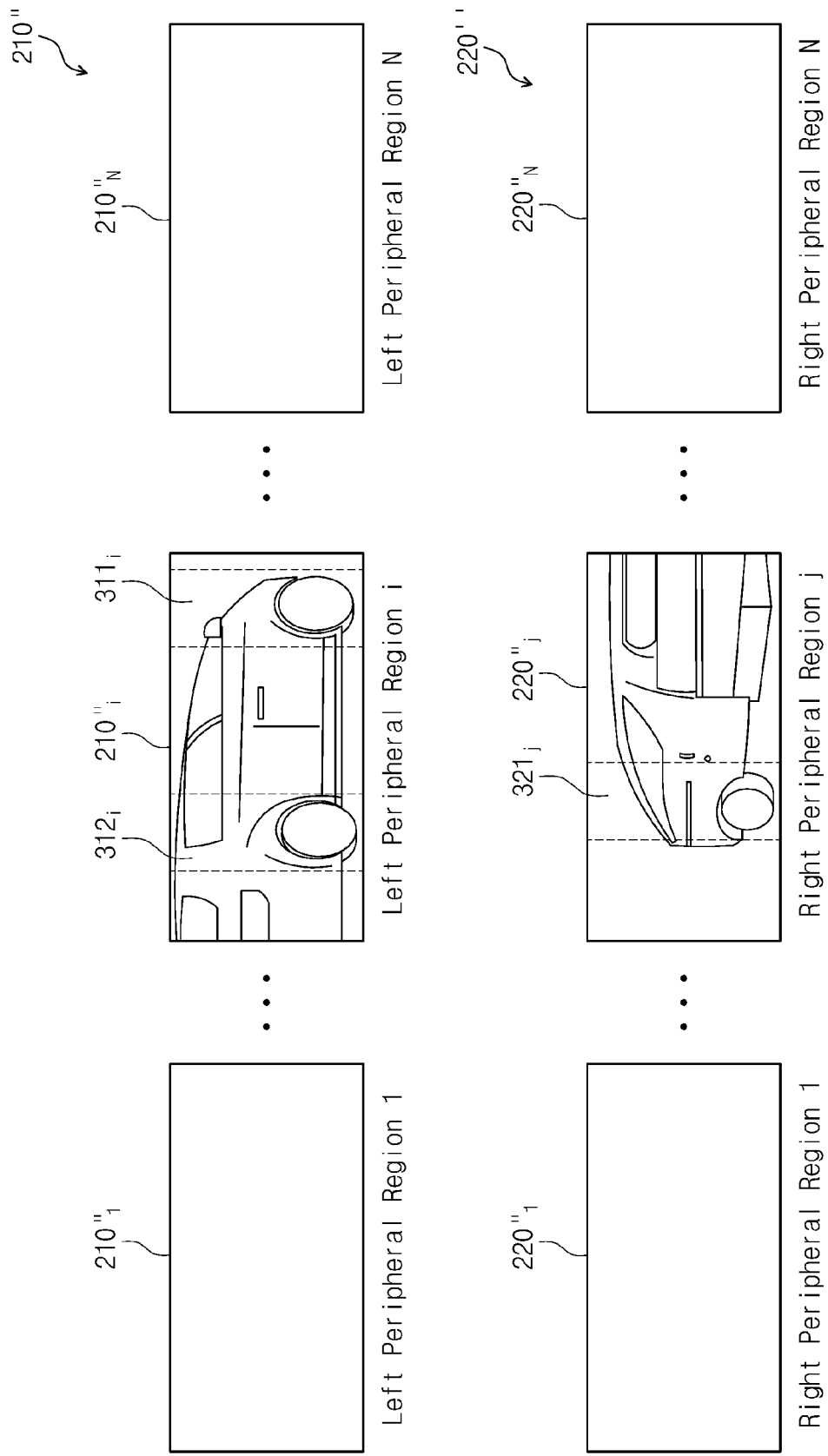
FIG. 9 is an exemplary view for explaining a process of creating a mosaicking image and detecting an object from the mosaicking image according to an embodiment of the present invention.

FIG. 9 is an exemplary view for explaining a process of creating mosaicking images 210" and 220" and detecting an object from the mosaicking images 210" and 220" according to an embodiment of the present invention.

Referring to FIG. 9, the left peripheral mosaicking image 210" and the right peripheral mosaicking image 220" may be formed as images like panorama that is long-extended in the horizontal direction by connecting the left peripheral regions $210_1"$ to $210_N"$ of which heights are equally adjusted to the height H' in the horizontal direction and the right peripheral regions $220_1"$ to $220_N"$ of which heights are equally adjusted to the height H' in the horizontal direction.

As a result, the peripheral mosaicking images 210" and 220" have heights corresponding to the heights of the target objects $310_i$ and $320_j$ desired to detect through image processing, that is, other vehicles passing by the moving vehicle and allowing parts thereof to be viewed, and lengths corresponding to values that the number N of the peripheral regions is multiplied by a length of a single peripheral region.

According to an embodiment of the present invention, the object detecting unit 140 may detect an object in a longitudinal direction, namely, a horizontal direction with respect to the peripheral mosaicking images 210" and 220".

As described above, since the peripheral mosaicking images 210" and 220" have heights corresponding to the target object desired to detect, the object detecting unit 140 does not have to perform a process for detecting an object in a height direction of the peripheral mosaicking images 210" and 220" and may detect a desired object even with a one-dimensional object search job.

According to an embodiment, the object detecting unit 140 may detect an object one-dimensionally from the peripheral mosaicking images 210" and 220" by using a histogram of oriented gradient (HOG) detector.

According to an embodiment of the present invention, the object detecting unit 140 may detect an object with a small calculation amount by searching for the object in a longitudinal direction without scaling the image for the object detection.

Furthermore, since the peripheral mosaicking images 210" and 220" are respectively single images extended in the longitudinal direction by the number of the peripheral regions, the object detecting unit 140 may perform image processing by calling only once a function of object detection, and achieve an increase in image processing speed due to reduction in the number of times of function calls.

As the foregoing, when the target object desired to detect through the image processing is a vehicle passing by the moving vehicle and allowing a part thereof to be viewed, the object detecting unit 140 may recognize presence of the vehicle by detecting the part of the vehicle including a vehicle's wheel.

According to an embodiment, the object detecting unit 140 may detect the part of the vehicle including the vehicle's wheel from the peripheral mosaicking images 210" and 220" by means of a machine learning algorithm using the vehicle's wheel as feature points.

For example, referring to FIG. 9, the object detecting unit 140 may recognize the vehicle by detecting parts $311_i$ and $312_i$ of the vehicle including the vehicle's wheel, while searching for an object in a horizontal direction with respect to the left peripheral mosaicking image 210".

Similarly, referring to FIG. 9, the object detecting unit 140 may recognize the vehicle by detecting parts $321_i$ and $322_i$ of the vehicle including the vehicle's wheel, while searching for an object in a horizontal direction with respect to the right peripheral mosaicking image 220".

In this case, the object detecting unit 140 may use the vehicle's wheel as the feature points and recognize the vehicle by detecting one of or all the two parts $311_i$ and $321_j$ including the front wheels and parts $312_i$ and $322_j$ including the rear wheels.

Referring FIG. 1 again, the image processing device 100 may further include a coordinate converting unit 150. The coordinate converting unit 150 may convert coordinates of the detected objects on the mosaicking image 210" and 220" into coordinates on the image 20.

As a result, the image processing device 100 may obtain the coordinates on the image 20 for the target objects included in the image 20, namely, other vehicles passing by sides of the moving vehicle and allowing parts thereof to be viewed.

The image processing device 100 may further include an image calibrating unit 160 calibrating at least one of lens distortion and skew with respect to the image 20 before extracting the peripheral regions $210_1$ to $201_N$, and $220_1$ to $220_N$ from the image 20.

Figure 10:
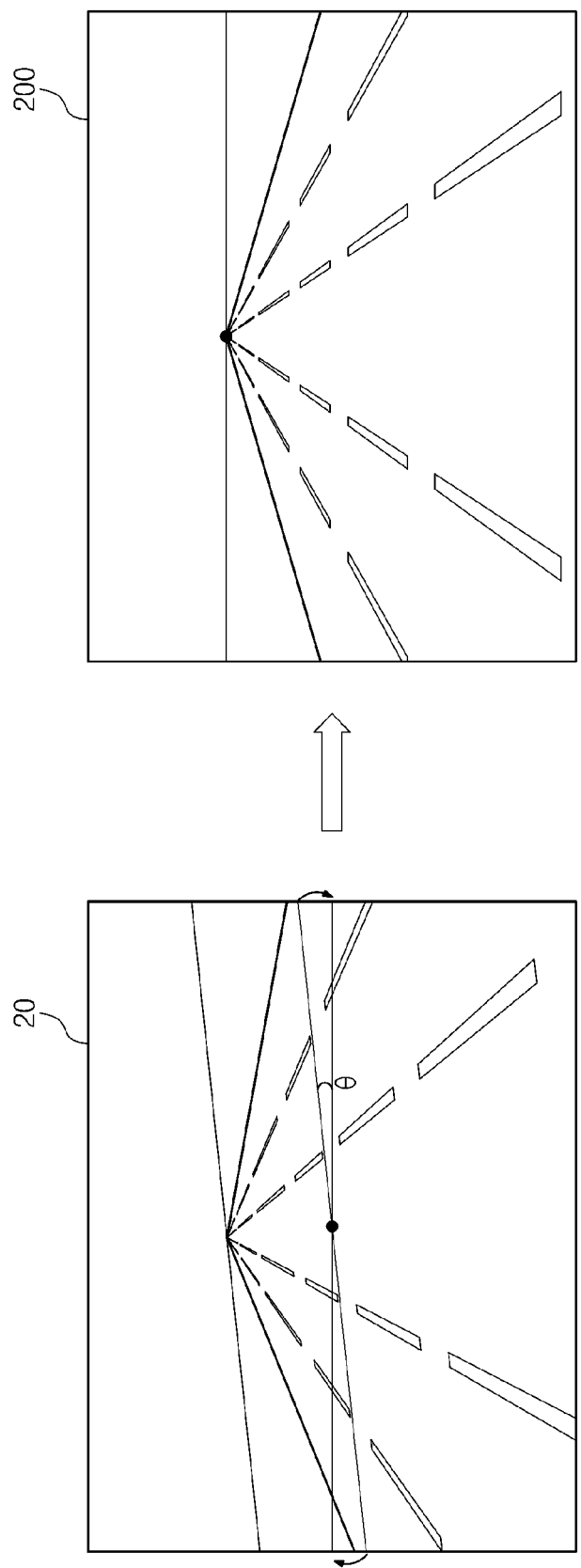
FIG. 10 is an exemplary view for explaining a process of calibrating skew on the image according to an embodiment of the present invention.

FIG. 10 is an exemplary view for explaining a process of calibrating skew on the image 20 according to an embodiment of the present invention.

The image output from the camera may include lens distortion and skew due to problems of camera lens and camera mount. For example, as illustrated in FIG. 10, an initial image output from the camera may include skew by θ due to slanted camera.

The image calibrating unit 160 may correct at least one of the lens distortion and the skew with respect to the image 20 before extracting the peripheral regions $210_1$ to $201_N$, and $220_1$ to $220_N$ from the image 20.

In particular, as the foregoing, when the peripheral regions $210_1$ to $201_N$, and $220_1$ to $220_N$ are extracted based on positions of the vanishing point P and the horizon $L_0$, reliability for an object detection result may be improved by performing image calibration before extracting the regions.

Figure 11:
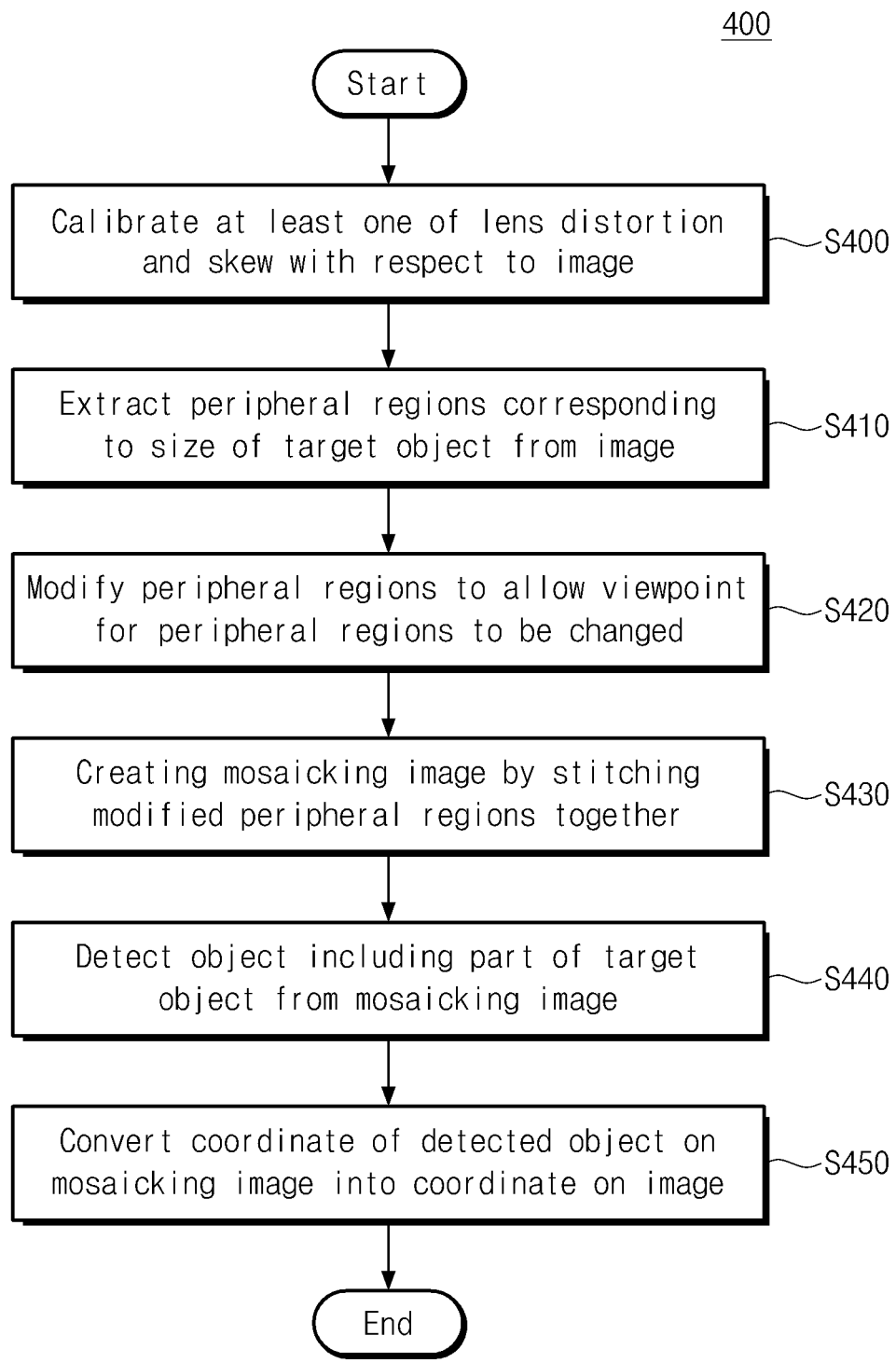
FIG. 11 is an exemplary flowchart of an image processing method according to an embodiment of the present invention.

FIG. 11 is an exemplary flowchart of an image processing method 400 according to an embodiment of the present invention.

The image processing method 400 may be performed by the image processing device 100 according to an embodiment of the present invention.

As illustrated in FIG. 11, the image processing method 400 may include an operation S410 of extracting the peripheral regions $210_1$ to $201_N$, and $220_1$ to $220_N$ corresponding to the sizes of the target objects $310_i$ and $320_j$ determined in advance from the image 20, an operation S420 of modifying the peripheral regions $210_1$ to $201_N$, and $220_1$ to $220_N$ to allow a viewpoint for the peripheral regions $210_1$ to $201_N$, and $220_1$ to $220_N$ to be changed, an operation S430 of creating mosaicking images 210" and 220" by stitching the modified peripheral regions together, and an operation S440 of detecting the objects $311_i$, $312_i$, $321_j$, and $322_j$ including parts of the target objects $310_i$ and $320_j$ from the mosaicking image 210" and 220".

Figure 12:
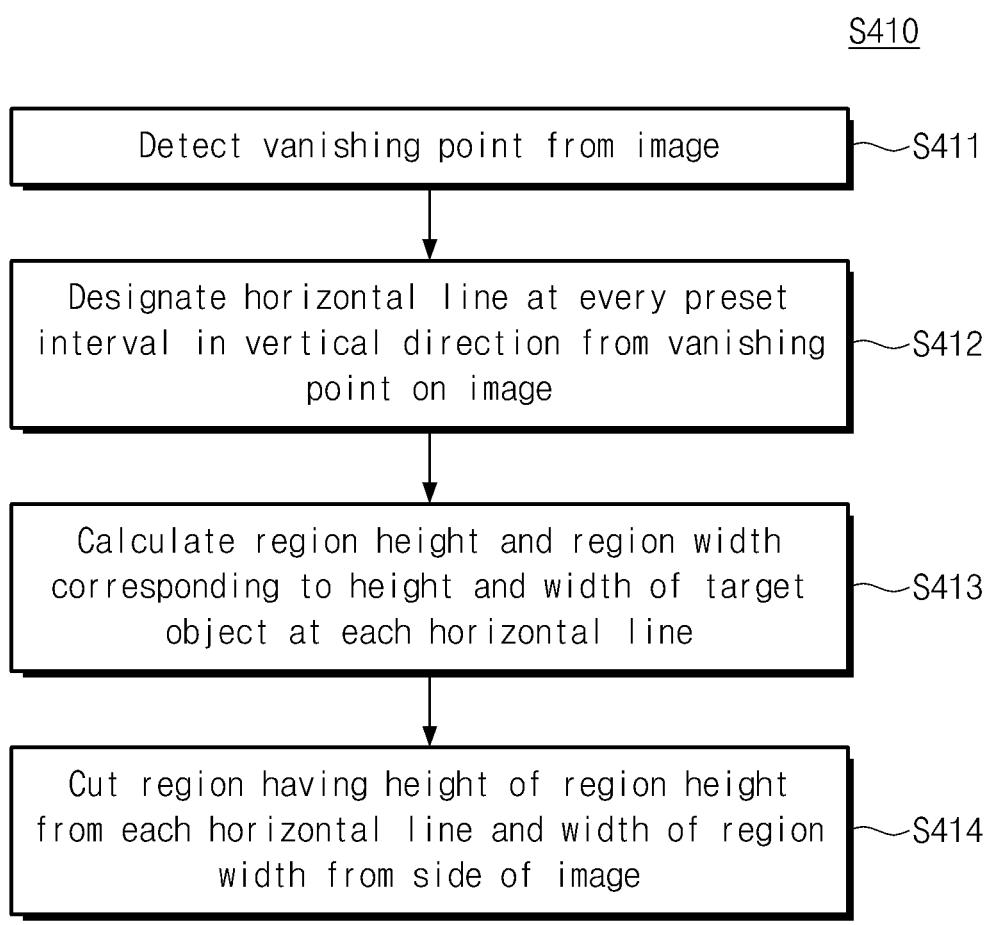
FIG. 12 is an exemplary flowchart for explaining a process of extracting peripheral regions from an image according to an embodiment of the present invention.

FIG. 12 is an exemplary flowchart for explaining a process of extracting peripheral regions from the image 20 according to an embodiment of the present invention.

As illustrated in FIG. 12, operation S410 of extracting the peripheral regions from the image 20 may include an operation S411 of detecting the vanishing point P from the image 20, an operation S412 of designating respective horizontal lines $L_1$ to $L_N$ at every preset interval in a vertical direction from the vanishing point on the image 20, an operation S413 of calculating region heights $H_i$ and $H_j$ and region widths $W_i$ and $W_j$ corresponding to the height and widths of the target objects $310_i$ and $320_j$ at each of the horizontal lines $L_1$ to $L_N$, and an operation S414 of cutting a region having a height of the region heights $H_i$ and $H_j$ from each of the horizontal lines $L_1$ to $L_N$ and a width of the region widths $W_i$ and $W_j$ from sides of the image 20.

Figure 13:
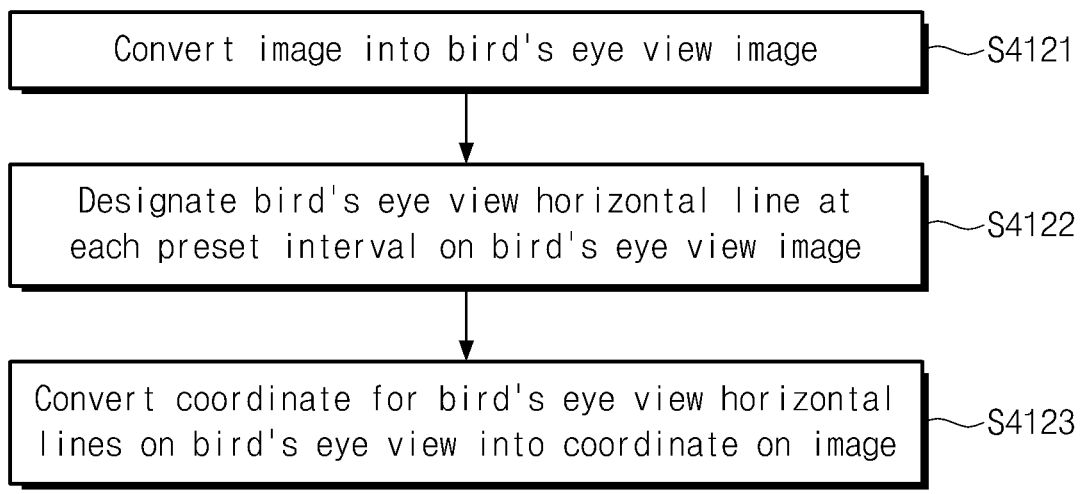
FIG. 13 is an exemplary flowchart for explaining a process of designating horizontal lines on the image according to an embodiment of the present invention.

FIG. 13 is an exemplary flowchart for explaining a process of designating horizontal lines $L_1$ to $L_N$ on the image 20 according to an embodiment of the present invention.

As illustrated in FIG. 13, operation S412 of designating the horizontal lines $L_1$ to $L_N$ on the image 20 may include an operation S4121 of converting the image 20 into an bird's eye view image 20', an operation S4122 of designating respective bird's eye view horizontal lines $L_1'$ to $L_N'$ at every preset interval on the bird's eye view image 20', and an operation S4123 of converting coordinates on the bird's eye view image 20' for the bird's eye view horizontal lines $L_1'$ to $L_N'$ into coordinates on the image 20.

According to an embodiment of the present invention, operation S414 of cutting the region may include an operation of cutting a left region having a height of the region heights $H_i$ and $H_j$ from each of the horizontal lines $L_1$ to $L_N$ and a width of the region widths $W_i$ and $W_j$ from the left side of the image 20, and cutting a right region having a height of the region heights $H_i$ and $H_j$ from each of the horizontal lines $L_1$ to $L_N$ and a width of the region widths $W_i$ and $W_j$ from the right side of the image 20.

According to an embodiment, the region heights $H_i$ and $H_j$ and the region widths $W_i$ and $W_j$ may be proportional to a distance between the corresponding horizontal line and the vanishing point P.

In addition, according to an embodiment of the present invention, operation S420 of modifying the peripheral regions may include an operation of warping the peripheral regions for allowing the viewpoint to face a direction vertical to the central axis of the lens capturing the image 20.

Figure 14:
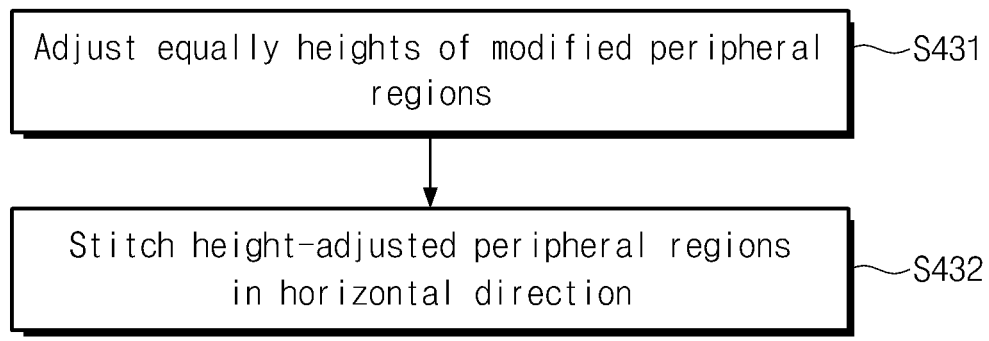
FIG. 14 is an exemplary flowchart for explaining a process of creating a mosaicking image according to an embodiment of the present invention.

FIG. 14 is an exemplary flowchart for explaining a process of creating the mosaicking images 210" and 220" according to an embodiment of the present invention.

As illustrated in FIG. 14, operation S430 of creating the mosaicking images 210" and 220" may include an operation S431 of adjusting the heights of the modified peripheral regions to be equal and an operation S432 of stitching the height-adjusted peripheral regions together in a horizontal direction.

According to an embodiment of the present invention, operation S440 of detecting the object may include an operation of detecting objects $311_i$, $312_i$, $321_j$, and $322_j$ with respect to the mosaicking image 210" and 220".

According to an embodiment, the target object may be a vehicle, in detail, another vehicle passing by a side of the moving vehicle and allowing a part thereof to be viewed, and the detected objects $311_i$, $312_i$, $321_j$, and $322_j$ are parts of the vehicle including a vehicle's wheel.

According to an embodiment, operation S440 of detecting the object may include an operation of detecting a part of the vehicle including the vehicle's wheel from the mosaicking images 210" and 220" by means of a machine learning algorithm using the vehicle's wheel as feature points.

Referring to FIG. 11 again, the image processing method 400 may further include an operation S450 of converting coordinates on the mosaicking images 210" and 220" of the detected objects into coordinates on the image 20 after operation S440 of detecting the object.

In addition, the image processing method 400 may further include an operation S400 of calibrating at least one of the lens distortion and skew for the image 20 before operation S410 of extracting the peripheral regions.

Figure 15:
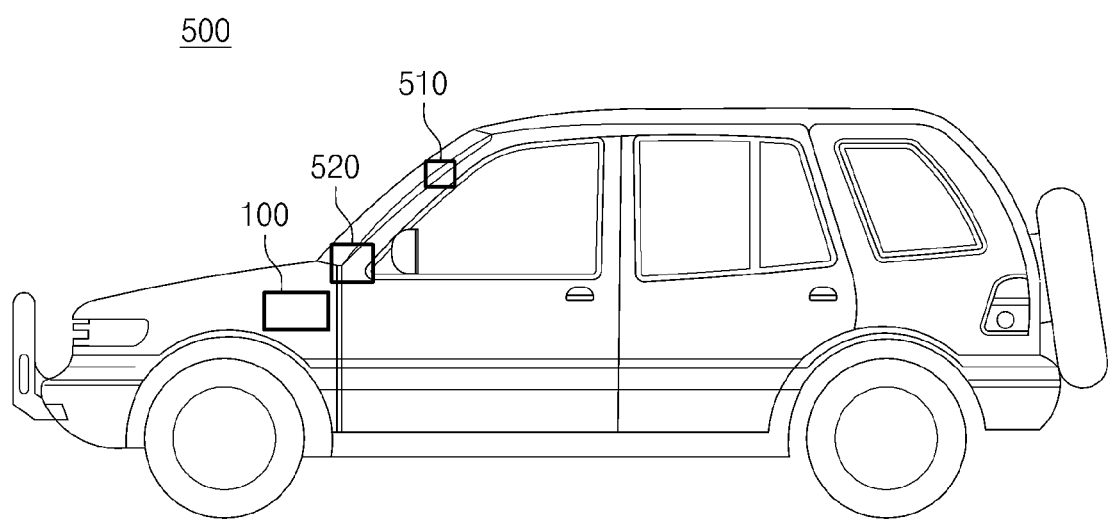
FIG. 15 is a schematic block diagram of a driving assistance system according to an embodiment of the present invention.

FIG. 15 is a schematic block diagram of a driving assistance system 500 according to an embodiment of the present invention.

Referring to FIG. 15, the driving assistance system 500 according to the embodiment of the invention may include a camera 510, the image processing device 100 and an output unit 520.

The camera 510 may be mounted in a vehicle and capture periphery of the vehicle. For example, the camera 510 may be mounted on a room mirror in the vehicle and capture a forward view of the vehicle.

An image output from the camera 510 may be provided to the image processing device 100. The image processing device 100 may also be mounted in the vehicle, and include a processor and a storage device for image processing.

The image processing device 100 may correspond to the image processing device 100 according to an embodiment of the present invention, and detect an object passing by a side of the moving vehicle and allowing a part thereof to be viewed, for example, another vehicle, by performing the forgoing image processing method 400.

The output unit 520 may output information on the detected object and provide the information to a user, for example, a vehicle passenger including a driver.

According to an embodiment, the output unit 520 may be a projector projecting an image about the detected object onto a front window of the vehicle, but the output unit 520 providing information on the object to the user is not limited hereto. As an example, the output unit 520 may provide the information on the object through voice or vibration, instead of the image, to the user.

As a result, the driving assistance system 500 may recognize obstacles interrupting driving and inform the user of presence of the obstacles, and may be applied to a system for avoiding a collision while traveling according to an embodiment.

The image processing method 400 according to an embodiment of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

According to an embodiment of the present invention, peripheral regions corresponding to the target object size determined in advance are extracted at the time of object detection to create a mosaicking image and detect an object therefrom. Accordingly, a calculation amount required to detect the object can be reduced and the number of times of function calls for the object detection can also be decreased to improve an image processing speed.

In addition, a vehicle abruptly appearing on a forward view image while passing by a side of a moving vehicle or a vehicle of which only a part appears on the forward view image can be accurately and rapidly detected.

According to embodiments of the present invention, a calculation amount required to detect an object can be reduced.

According to embodiments of the present invention, an image processing time can be shortened by calling only once a function for object detection per an image.

According to embodiments of the present invention, a vehicle abruptly appearing on a forward view image while passing by a moving vehicle or a vehicle of which only a part appears in the forward view image can be accurately and rapidly detected.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An image processing device comprising:
one or more processors; and
at least one memory coupled to the one or more processors, the at least one memory having instructions stored thereon which, when executed by the one or more processors, cause:
extracting unit extracting, from an image, peripheral regions corresponding to a size of a target object determined in advance;
modifying the peripheral regions to allow a viewpoint for the peripheral regions to be changed;
creating unit creating a mosaicking image by adjusting heights of the modified peripheral regions equally and stitching the height-adjusted peripheral regions together in a horizontal direction; and
detecting an object including a part of the target object from the mosaicking image in the horizontal direction with respect to the mosaicking image.

2. The image processing device of claim 1, wherein the instructions, when executed by the one or more processors, further cause:
detecting a vanishing point from the image;
designating a horizontal line at every preset interval in a vertical direction from the vanishing point on the image and calculating a region height and a region width corresponding to a height and a width of the target object at each of the horizontal lines; and
cutting regions having a height of the region height from each of the horizontal lines and a width of the region width from sides of the image.

3. The image processing device of claim 2, wherein cutting of the regions comprises cutting a left region having a height of the region height from each of the horizontal lines and a width of the region width from the left side of the image, and cutting a right region having a height of the region height from each of the horizontal lines and a width of the region width from the right side of the image.

4. The image processing device of claim 2, wherein the instructions, when executed by the one or more processors, further cause: converting unit converting the image into a bird's eye view image, and
designating a bird's eye view horizontal line at every preset interval and designating the horizontal lines on the image by converting coordinates of the bird's eye view horizontal lines on the bird's eye view image into coordinates on the image.

5. The image processing device of claim 2, wherein the region height and the region width are proportional to a distance between a corresponding horizontal line and the vanishing point.

6. The image processing device of claim 1, wherein the instructions, when executed by the one or more processors, further cause:
warping the peripheral regions to allow the viewpoint to face a direction perpendicular to a central axis of a lens capturing the image.

7. The image processing device of claim 1, wherein the target object is a vehicle and the object includes a wheel of the vehicle.

8. The image processing device of claim 7, wherein the instructions, which when executed by the one or more processors, further cause:
detecting a part of the vehicle including the wheel from the mosaicking image using a machine learning algorithm with the wheel of the vehicle as feature points.

9. The image processing device of claim 1, wherein the instructions, which when executed by the one or more processors, further cause:
converting a coordinate of the detected object on the mosaicking image into a coordinate of the image.

10. The image processing device of claim 1, wherein the instructions, which when executed by the one or more processors, further cause: calibrating at least one of lens distortion and skew for the image, before extracting the peripheral regions.

11. An image processing method comprising:
extracting, from an image, peripheral regions corresponding to a size of a target object determined in advance;
modifying the peripheral regions to allow a viewpoint of the peripheral regions to be changed;
stitching the modified peripheral regions together and creating a mosaicking image; and
detecting an object including a part of the target object from the mosaicking image;
wherein the creating of the mosaicking image comprises:
adjusting heights of the modified peripheral regions equally; and stitching the height-adjusted peripheral regions together in a horizontal direction,
wherein the detecting of the object comprises detecting the object in the horizontal direction with respect to the mosaicking image.

12. The image processing method of claim 11, wherein the extracting of the peripheral regions comprises,
detecting a vanishing point from the image;
designating a horizontal line at every preset interval in a vertical direction from the vanishing point on the image;
calculating a region height and a region width corresponding to a height and a width of the target object at each of the horizontal lines; and
cutting regions having a height of the region height from each of the horizontal lines and a width having the region width from sides of the image.

13. The image processing method of claim 12, wherein the cutting of the regions comprises,
cutting a left region having a height of the region height from each of the horizontal lines and a width of the region width from the left side of the image; and
cutting a right region having a height of the region height from each of the horizontal lines and a width of the region width from the right side of the image.

14. The image processing method of claim 12, wherein the designating of the horizontal line comprises,
converting the image into a bird's eye view image;
designating a bird's eye view horizontal line at every present interval on the bird's eye view image; and
converting coordinates of the bird's eye view horizontal lines on the bird's eye view image into coordinates on the image.

15. The image processing method of claim 12, wherein the region height and the region width are proportional to a distance between a corresponding horizontal line and the vanishing point.

16. The image processing method of claim 11, wherein the modifying of the peripheral regions comprises warping the peripheral regions to allow the viewpoint to face a direction perpendicular to a central axis of a lens capturing the image.

17. The image processing method of claim 11, wherein the target object is a vehicle and the object comprises a wheel of the vehicle.

18. The image processing method of claim 17, wherein the detecting of the object comprises detecting a part of the vehicle including the wheel from the mosaicking image by means of a machine learning algorithm by using the vehicle's wheel as feature points.

19. The image processing method of claim 11, further comprising converting a coordinate of the detected object on the mosaicking image into a coordinate of the image, after the detecting of the object.

20. The image processing method of claim 11, further comprising calibrating at least one of lens distortion and skew for the image, before the extracting of the peripheral regions.

21. A driving assistance system comprising:
a camera capturing periphery of a vehicle; and
an image processing device comprising one or more processors and at least one memory coupled to the one or more processors, the at least one memory having instructions stored thereon which, when executed by the one or more processors, cause:
extracting, from an image captured by the camera, peripheral regions corresponding to a size of a target object determined in advance;
modifying the peripheral regions to allow a viewpoint for the peripheral regions to be changed;
creating a mosaicking image by adjusting heights of the modified peripheral regions equally and stitching the height-adjusted peripheral regions together in a horizontal direction;
detecting the object including a part of the target object from the mosaicking image in the horizontal direction with respect to the mosaicking image; and
outputting information on the detected object.

22. The driving assistance system of claim 21, wherein the camera captures a forward view of the vehicle, and
the target object is another vehicle passing by a side of the vehicle.

23. The driving assistance system of claim 21, wherein the instructions, when executed by the one or more processors, further cause: converting a coordinate of the detected object on the mosaicking image into a coordinate on the image.

24. The driving assistance system of claim 21, wherein the instructions, when executed by the one or more processors, further cause: calibrating at least one of lens distortion and skew for the image before extracting the peripheral regions from the image.

* * * * *